Jan. 15, 1963 L. J. SCHMERZLER 3,073,127
THERMOELECTRIC DEVICE FOR CONTROLLING THE PSYCHROMETRIC
CONDITION OF A FLOWING FLUID
Filed Aug. 2, 1961 3 Sheets-Sheet 1

INVENTOR.
LAWRENCE J. SCHMERZLER
BY
ATTORNEY

Jan. 15, 1963  L. J. SCHMERZLER  3,073,127
THERMOELECTRIC DEVICE FOR CONTROLLING THE PSYCHROMETRIC
CONDITION OF A FLOWING FLUID
Filed Aug. 2, 1961  3 Sheets-Sheet 2

INVENTOR.
LAWRENCE J. SCHMERZLER
BY
James and Franklin
ATTORNEY

United States Patent Office 3,073,127
Patented Jan. 15, 1963

3,073,127
THERMOELECTRIC DEVICE FOR CONTROLLING THE PSYCHROMETRIC CONDITION OF A FLOWING FLUID
Lawrence J. Schmerzler, Livingston, N.J., assignor to General Instrument Corporation, Newark, N.J., a corporation of New Jersey
Filed Aug. 2, 1961, Ser. No. 128,700
14 Claims. (Cl. 62—3)

The present invention relates to a device operating on the thermoelectric or Peltier effect for controlling the temperature and, if desired, the humidity, of a flowing fluid such as air.

There are many applications where the temperature and/or humidity of a body of air must be controlled. One such application, in connection with which the present invention is here specifically disclosed, is a so-called "proof box," where bread dough is permitted to rise prior to baking. The rising dough must be maintained for an appreciable period of time in an environment where the temperature and humidity of the air is maintained within rather restricted limits, the dough itself, while rising, affecting the air in such a way as to cause it to depart from the desired temperature and humidity conditions. It is most desirable, if bread of a uniform high quality is to be produced, that the air within the proof box be treated continuously to counteract the effect thereon on the rising dough. In industrial installations high capacity air conditioning equipment is employed for this purpose. There are many places, however, where the use of such heavy equipment is not feasible, but where, nevertheless, a considerable volume of bread baking is required, i.e., small naval vessels, such as destroyers and submarines, where there are large crews, but where the space and weight available for cooking equipment is limited.

It is a prime object of the present invention to devise a device which occupies but a small space, yet which is capable of modifying the temperature and humidity of a substantial volume of flowing fluid, such as air, in order to bring the phychrometric characteristics of the air to desired values and/or to maintain them at those values. It is a further prime object of the present invention to produce such a device which is reliable, and which requires substantially no moving parts. The nature of the present invention is such that it can be mounted on a wall or door of a cabinet the air within which is to be treated, without taking up any appreciable amount of extra space, and without producing any appreciable vibration or noise.

When one desires to maintain the temperature or humidity of a body of air at a desired value, while that air is being constantly subjected to external influences tending to cause the temperature or humidity to depart from those values, it is difficult to devise a control system capable of effective operation. No matter how sensitive the temperature and humidity detecting devices used may be, there is often considerable "inertia" in the overall system, which results in constant cycling and recycling of the equipment, particularly where, as is the case here, the equipment is capable of both heating and cooling of the treated fluid. Accordingly, control systems for devices of this type are often exceedingly complex, and usually involve a rather high degree of power consumption. Moreover, many systems, while effective to control temperature, are ineffective to control humidity as well.

The device of the present invention, by way of contrast, although capable of heating the air when it is too cool, and cooling the air when it is too warm, is nevertheless so designed that it can effectively and accurately control both temperature and humidity by means of a simple control system, and with a truly minimal consumption of power.

In accordance with the present invention, electrically energized thermoelectric elements are utilized to produce both heating and cooling action on the air to be treated. These elements are connected electrically in series and thermally in parallel. Separate air travel paths are provided, one path being in thermal communication with the "hot" junctions of the thermoelectric elements and the other being in thermal communication with the "cold" junctions. A simple valve controls the passage of the air to be treated through these paths so as to produce the desired overall heating or cooling effect. The heat generated at the "hot" junctions is utilized where heating of the air to be treated is desired, and any excess heat is dissipated to the ambient surroundings. The valve which controls the flow of air is capable of directing all or any desired portion of the air through one path or the other. After the air has been thus heated or cooled, depending upon which path it has taken, the entire body of air—both the heated air and the cooled air—is combined and is then controllably directed by another valve to a humidifying device, where, again, two air paths are provided, one by-passing the humidifying device and the other operatively entering that device. This other valve controls the amounts of air which respectively is humidified and is untreated from a humidification point of view. All of the air—both that which is humidified, and that which by-passes the humidifier—is then combined and reenters the space being treated. The valves which control the passage of air for heating or cooling and for humidification or by-pass are respectively controlled by any appropriate temperature and humidity sensing devices.

As a result, and without using noxious gases or having any moving parts other than the two valves above described, control of air temperature and humidity is achieved without any cycling or temperature drift, thus resulting in minimum thermal stresses, longer life and improved reliability.

In its preferred form, as here specifically disclosed, the hot and cold junctions of the thermoelectric elements are in thermal communication with fins extending respectively in different directions from those elements. The fins extending from the hot junctions enter a conduit through which the air to be heated passes, and are then exposed beyond that conduit for heat dissipation purposes. Efficiency is improved if a forced draft of ambient air passes over the thus-exposed heat-dissipating portions of those fins. The fins thermally connected to the cold junctions of the thermoelectric elements enter a second conduit through which air to be cooled passes. These two conduits join one another beyond the heating and cooling fins respectively, so that the air flowing through these conduits is combined. By controlling the proportions of air flowing through each of these conduits, the overall heating and cooling effect on the air is achieved. If additional humidity control is required, the combined air is then divided by another valve into a portion which passes through the humidifier and a portion which by-passes the humidifier.

To the accomplishment of the above, and to such other objects as may hereinafter appear, the present invention relates to a device for controlling and modifying the temperature and, if desired, the humidity of a flowing fluid, as defined in the appended claims, and as described in this specification, taken together with the accompanying drawings in which:

While the device of the present invention is here specifically disclosed as used to control the temperature and humidity of air circulating within a proof box where rising dough is adapted to be stored, it will be understood that this is but exemplary of a wide variety of installations where the present invention can be used.

Figure 1:
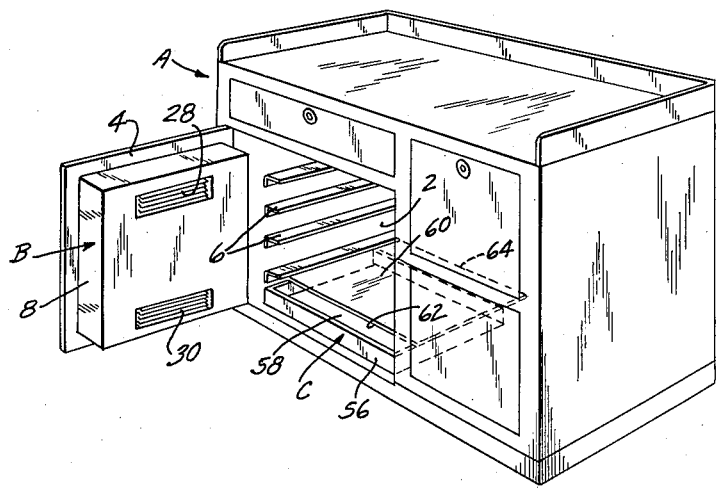
FIG. 1 is a three-quarter perspective view of the device of the present invention, the temperature-modifying structure being mounted on the inside of the door of a "proof box" cabinet, and the humidifier being mounted on the floor of the cabinet chamber.

FIG. 1 discloses a proof box cabinet, generally designated A, which comprises an enclosure 2 provided with a door 4, within which enclosure a number of pans of rising dough are adapted to be supported on the rails 6. The air within the enclosure 2 will be heated and will take on moisture from the rising dough. However, for best results in bread production, the temperature of the air within the enclosure 2 should be maintained within relatively narrow limits (plus or minus 4° F. in a range from about 85° F. to 105° F., depending upon the type of dough involved—bread, cake, pastry or cookies). The relative humidity of the air within the enclosure 2 must also be maintained within narrow limits at approximately 90% to avoid glazing or excessive surface drying at high or low humidity extremes.

It is to maintain the air within the desired temperature and humidity limits that the instant device is specifically designed. That device comprises a temperature control section, generally designated B, and a humidity control section, generally designated C.

Figure 3:
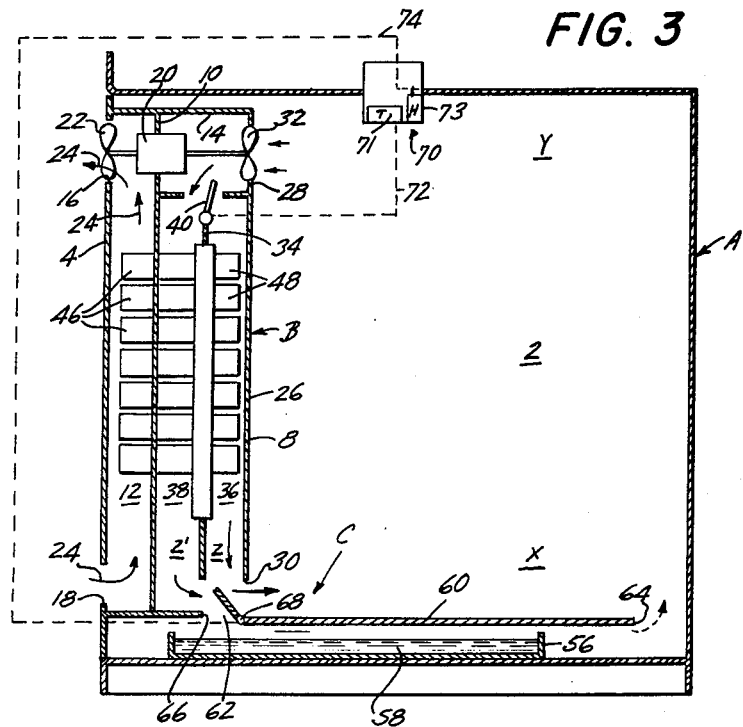
FIG. 3 is a diagrammatic view of the overall device.
Figure 6:
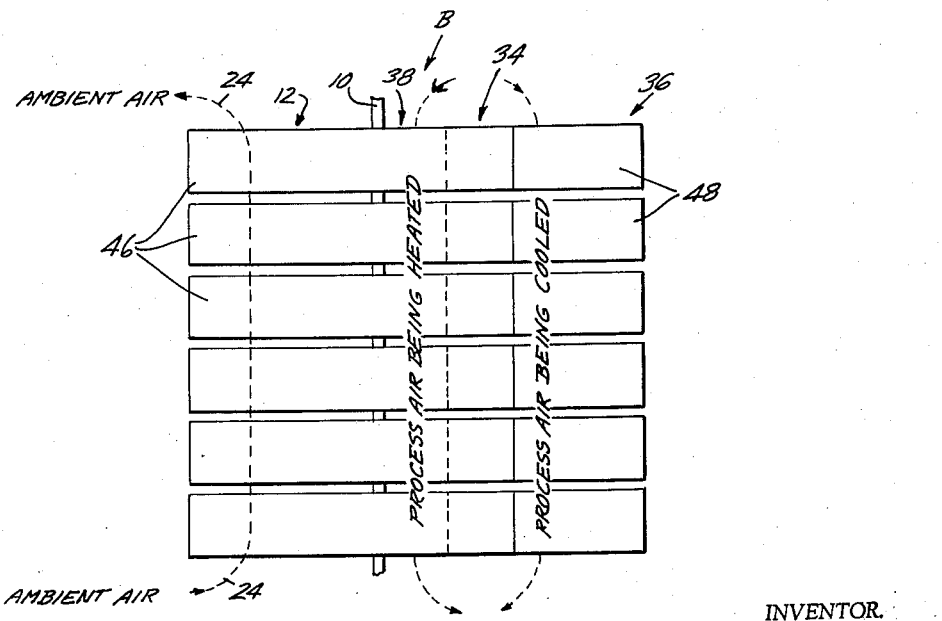
FIG. 6 is a diagrammatic view, in the nature of a side elevational view, of the assembly of FIG. 5.

The temperature control section B is enclosed wholly or partially within the casing 8, which may be mounted on any appropriate part of the proof box A, such as the inside of the door 4 thereof. The casing 8 is divided by a vertical partition 10 into sections 12 and 14. The section 12, the outer wall of which may be defined by the door 4, is provided with upper and lower air openings 16 and 18 (see FIG. 3). A motor 20 is mounted on the upper portion of the partition 10 and drives exhaust fan 22 operatively related to the upper opening 16, thereby causing a flow of air through the section 12 as indicated by the arrows 24 in FIGS. 3 and 6.

The section 14 is provided in its outer wall 26 with upper and lower air inlet openings 28 and 30. The motor 20 drives a suction fan 32 operatively related to the opening 28 so that air is drawn in through the opening 28 and is forced out through the opening 30. A vertical partition 34 divides the section 14 into parts 36 and 38, each of these parts defining a conduit means through which air can flow. The control of air flow through the conduit means 36 and 38 is achieved by means of a valve means, such as butterfly valve 40, located at the upper end of the conduit means 36 and 38, that the valve being movable either to cause all of the air entering through the opening 28 to pass through the conduit 36 or 38, or to divide the air so that a predetermined portion thereof passes through the conduit 36 and the remainder passes through the conduit 38.

Figure 2:
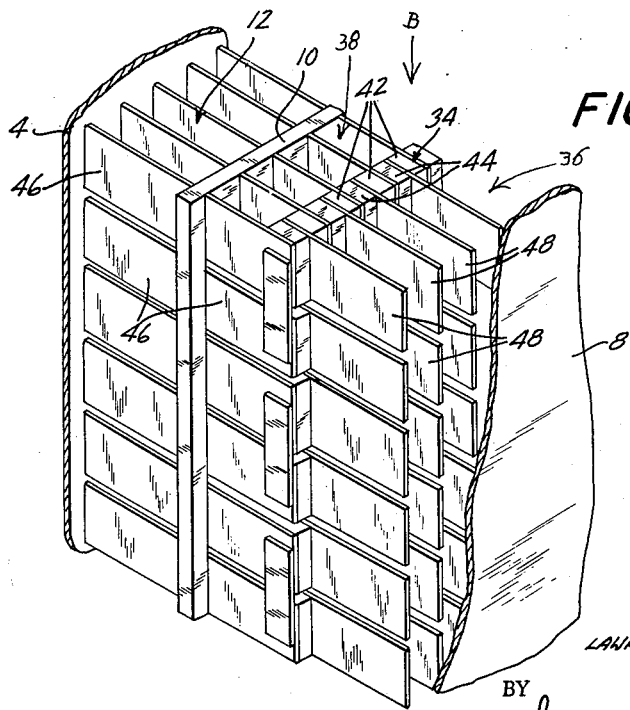
FIG. 2 is a three-quarter perspective view, partially broken away, of a portion of the door-mounted device.
Figure 5:
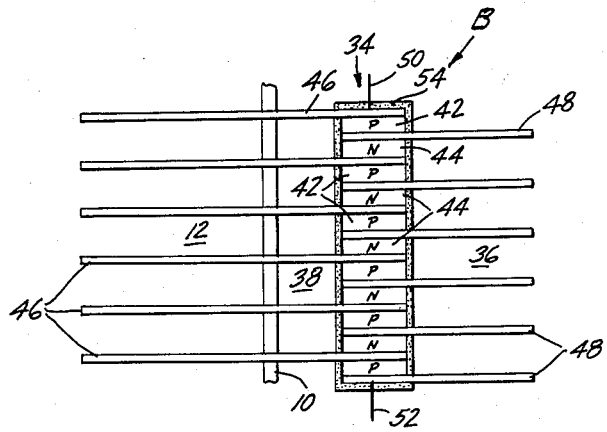
FIG. 5 is a diagrammatic view, in the nature of a top plan view, of the thermoelectric assembly.

The thermoelectric assembly per se, which provides for the cooling and heating of the air, is mounted on, and may in part itself define, the partition 34. It comprises a plurality of thermoelectric elements 42 and 44. Many types of such elements are known. They may, for example, consist of bismuth telluride material appropriately doped so as to give them "N" and "P" characteristics respectively. The elements 42 and 44 are arranged in a plurality of laterally extending rows, each of the elements alternating with the other in a given row, and sets of fins 46 and 48, formed of heat- and electricity-conducting material such as aluminum-coated bronze, are alternately interposed therebetween, one set of fins 46 extending out to the left through the conduit means 38 and into the section 12, the other set of fins 48 extending out to the right into the conduit means 36. The portions of the fins 46 and 48 sandwiched between the elements 42 and 44 are in good thermal and electrical communication with the opposed faces of those elements. As is schematically indicated in FIG. 5, the external source of D.C. electrical energy is electrically connected to the ends of the stack of elements and fins as by leads 50 and 52 (see FIG. 5), the polarity of the electric energy supplied through the leads 50 and 52 being such, in conjunction with the specific characteristics of the thermoelectric elements 42 and 44, as to place the fins 46 at the "hot" faces of the thermoelectric elements (that is to say, those faces where the passage of current in desired direction results in a raising of temperature), the fins 48 being at the "cold" faces of the elements 42 and 44 (that is to say, where the passage of current in that desired direction results in a lowering of the temperature). Each of these assemblies of elements 42, 44, together with the portions of the fins 46 and 48 sandwiched therebetween, may be coated with a hard-setting resin layer 54, such as an epoxy, for purposes of electrical insulation as well as strength. As may be seen from FIG. 2, the thermoelectric assembly proper may consist of a plurality of vertically arranged rows or nodules, each comprising a set of elements 42, 44 with associated fins 46, 48.

At the lower end of the section 14 the conduit means 36 and 38 join one another, so that the bodies of air flowing therethrough will combine, and then pass to the interior of the enclosure 2.

Where separate humidity control is desired a humidification device C is provided which, in the simple form here disclosed, may comprise a tray 56 supported on the floor of the enclosure 2 and adapted to contain water 58. A cover 60 extends over the tray 56, but exposes it at the areas 62 and 64 at the front and rear of the enclosure 2 respectively. When the door 4 is closed the housing 8 extends over and covers the exposed area 62, with the opening 30 at the lower end of the front face thereof being exposed at a point above the cover 60. The housing 8 is provided with a bottom opening 66 adapted to register with the area 62. A valve means, such as the butterfly valve 68, is located within the housing A and is arranged so as to control the amount of air coming from the conduit means 36 and 38 which passes respectively through the openings 30 and 66. The air which passes through the opening 66 will flow over the upper surface of the water 58 and will pick up moisture, and then will enter the enclosure 2 via the area 64. The air which escapes through the opening 30 will by-pass the humidifying device C and will enter the enclosure 2 directly.

The sensing assembly generally designated 70 is mounted within the enclosure 2, and may comprise a thermostat 71 and a humidistat 73 of any appropriate type. The thermostat 71 is operatively connected, as indicated by the dotted line 72, to the valve 40, positioning that valve in accordance with the temperature which it senses. The humidistat 73 is operatively connected, as indicated by the dotted line 74, to the valve 68, positioning that valve in accordance with the relative humidity which it senses.

In operation the leads 50 and 52 are energized and the motor 20 is driven in rotation. The electrical energization of the thermoelectric elements 42, 44 causes the temperature of the fins 48 to be lowered and causes the temperature of the fins 46 to be raised. A fan 32 drives air in through the opening 28 from the upper part of the enclosure 2. The temperature of that air is sensed by the thermostat 71 in the sensing assembly 70 and, depending upon that temperature, different proportions of the air entering through the opening 28 are directed by the valve 40 into the conduit means 36 and 38 respectively. The air which passes through the conduit means 36 is cooled and, in cooling, may give off moisture. The cooling effect arises from its passage over the fins 48, the temperature of which is reduced. The air which passes through the conduit means 38 is heated, by reason of the fact that the fins 46 over which it passes are at an elevated temperature, and the relative humidity of this air is reduced. The air passing through the conduit means 36 and 38 will mingle and be combined at the lower end of the section 14, and it will be apparent that the overall heating and cooling effect on the treated body of air will be determined by the relative proportions of that air which have been heated and cooled respectively.

While this is going on the fan 22 causes ambient air to pass over those portions of the fins 46 located within the section 12, thus dissipating the heat therefrom and maintaining the thermoelectric assembly and its parts at a temperature appropriate to its continued operation in accordance with the above description.

The combined air emanating from the conduit means 36 and 38 is then directed by valve 68 through the openings 30 and 66, either all through one opening or the other, or in part through one opening and in part through the other opening, depending upon the humidity of the air within the enclosure 2 as sensed by the humidistat 73 forming a part of the sensing assembly 70. That portion of the air which is directed by the valve 68 out through the opening 66 passes beneath the cover 60 and over the water 58 in the tray 56, thus picking up moisture. That portion of the air which is directed by the valve 68 through the opening 30 enters the enclosure 2 without any change in its humidity. Obviously, the relative amounts of air which pick up moisture on the way to the enclosure 2 and which enter the enclosure 2 directly will determine the humidity of the air within that enclosure.

Figure 4:
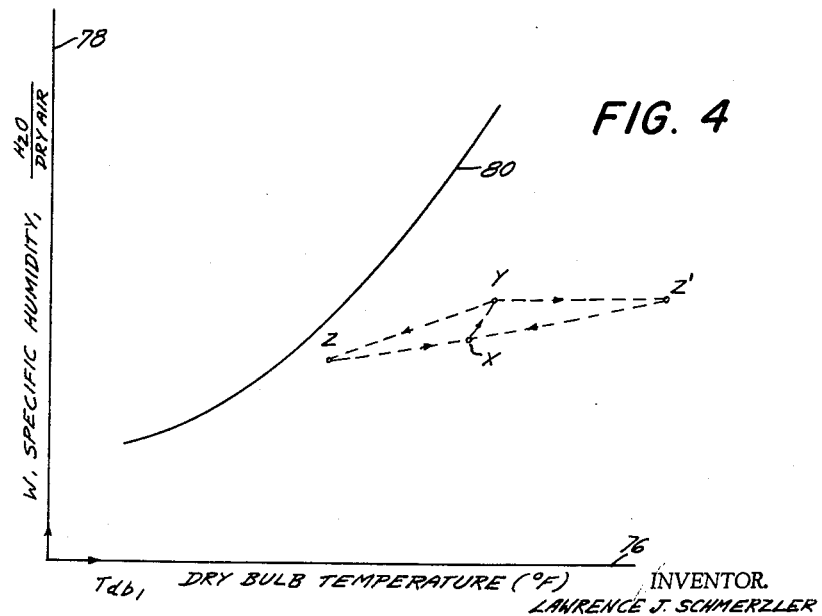
FIG. 4 is a graph showing the psychrometric effect of the device of the present invention on the treated fluid.

FIG. 4 is a psychrometric diagram of typical changes in the air as it is subjected to the conditions existing within the enclosure 2, and as it is modified by the action of the apparatus of the present invention. The abscissa 76 represents the dry bulb temperature of the air, the ordinate 78 represents the specific humidity of the air (weight of water per pound of dry air), and the solid line 80 indicates the specific humidity and temperature conditions for 100% saturation of the air. The point X represents a typical condition of air at the bottom of enclosure 2, a similar reference letter being appropriately placed in FIG. 3. As air moves upwardly through the enclosure 2, when that enclosure contains dough in the process of rising, its temperature increases and its specific humidity increases, (the air takes up heat and moisture from the dough), until it reaches the point Y at the top of the enclosure 2. That air which passes through the conduit means 36, in which it is subjected to a cooling action, goes from point Y to point Z, at which latter point it has been reduced in temperature, may have lost moisture, and its relative humidity has increased. The air passing through conduit means 38, in which it is subjected to a heating action, goes from point Y to point Z', at which latter point its temperature has been increased and its relative humidity has increased. When the air from points Z and Z' mingle the cooler air is heated and the warm air is cooled, bringing the air back to point X. The position of point X along the line Z, Z' will be determined by the proportions of air which are respectively heated and cooled, and the absolute position of point X will be dependent upon the amount of heating and cooling of the air in the conduits 38 and 36 respectively. If point X should be higher or lower than desired, indicating an increase or decrease in specific humidity, the valve 68 will bring point X to proper position by changing the proportions of the air which are respectively subjected to the action of the humidifier C and which by-pass that humidifier.

From the above it will be apparent that by means of a simple structure which does not utilize special gases, noxious or otherwise, and which has no moving parts except for the valves 40 and 68, constant and continuing control and adjustment of the temperature and humidity of the air within enclosure 2 is attained. In installations where sufficient air circulation is otherwise produced, it will be possible to do away with the forced draft ventilation created by the fan 32, and similarly if the surroundings are at a sufficiently low temperature or if movement of the ambient fluid over the heat dissipating fins 64 is otherwise produced to sufficient degree, the forced ventilation created by fan 22 can be dispensed with. Where only temperature control is of significance, and variations in humidity can be tolerated, the humidifier C and associated valve 68 can be eliminated. The entire structure is simple to install, takes up but a minimal amount of space, is substantially free of vibration and noise, and does not require any of the complicated, bulky, heavy and expensive auxiliary equipment required with prior art systems. Control is efficiently achieved through the use of simple and inexpensive components, without having to provide current reversing switches or complicated electrical or electronic circuitry.

The thermoelectric assembly per se is, it will be appreciated, capable of use in other applications, both for cooling and for heat generation. The arrangement of the thermoelectric elements 42 and 44 in line, with the cold and hot faces of adjacent elements opposing one another, and with heat-conductive members interposed between those opposed faces and in termal communication therewith, provides an effective means for producing useful thermoelectric conversions, and the unitary structure involved lends itself very well to the "modular" application, in which large assemblies may conveniently be built-up from a plurality of smaller assemblies.

While but a single embodiment of the present invention has been here disclosed, it will be apparent that many variations may be made herein, all within the scope of the instant invention as defined in the following claims.

I claim:

1. A device for modifying the temperature of a flowing fluid which comprises a support, a thermoelectric assembly thereon having a hot side and a cold side, electrical connections to said thermoelectric assembly for energization thereof, first and second conduit means for said fluid passing over said hot side and cold side of said thermoelectric assembly respectively, temperature control means operatively connected to said first and second conduit means for controllably directing said fluid therethrough, thereby to control the heating or cooling of said fluid, and means independent of said first conduit means for dissipating heat from the hot side of said thermoelectric assembly.

2. The device of claim 1, in which said dissipating means comprises heat-conductive means extending from said hot side of said thermoelectric assembly to a point outside said first conduit.

3. The device of claim 1, in which said dissipating means comprises heat-conductive means extending from said hot side of said thermoelectric assembly to a point outside said first conduit, and means for producing a flow of ambient fluid over said heat conductive means outside said first conduit means.

4. The device of claim 1, in which said thermoelectric assembly comprises a plurality of thermoelectric elements having hot and cold faces assembled between a plurality of heat conductive members, a first set of said members being in good heat transmissive relation to the hot faces of said elements and extending into said first conduit means, a second set of said members being in good heat transmissive relation to the cold faces of said elements and extending into said second conduit means.

5. The device of claim 4, in which said first set of members extend to a point outside said first conduit means, thereby to permit dissipation of heat therethrough independently of said first conduit means.

6. The device of claim 4, in which said first set of members extend to a point outside said first conduit means, thereby to permit dissipation of heat therethrough independently of said first conduit means, and means for producing a flow of ambient fluid over said first set of members outside said first conduit means.

7. In combination with the device of claim 1, a humidifying means, and humidity control means for mingling the fluids emanating from said first and second conduit means and controllably directing said mingled fluids through said humidifying means.

8. In the combination of claim 7, a bypass around said humidifying means, said humidity control means controllably dividing said mingled fluid into first and second components respectively differently operatively affected by said humidifying means.

9. A device for modifying the temperature of a flowing fluid which comprises a support, a thermoelectric assembly thereon having a hot side and a cold side, electrical connections to said thermoelectric assembly for energization thereof, first and second conduit means for said fluid passing over said hot side and cold side of said thermoelectric assembly respectively, and temperature control means operatively connected to said first and second conduit means for controllably directing said fluid therethrough, thereby to control the heating or cooling of said fluid, said thermoelectric assembly comprising a plurality of thermoelectric elements alternating in type, having hot and cold faces, and arranged with their hot and cold faces opposing similar faces of adjacent elements, and heat conductive members interposed between said elements in good heat transmissive relation to the opposed faces thereof, said members between opposed hot faces of adjacent elements extending into said first conduit means, said members between opposed cold faces of adjacent elements extending into said second conduit means, said members interposed between hot faces of adjacent elements extending to a point outside said first conduit means, thereby to permit dissipation of heat therefrom independently of said first conduit means.

10. In the device of claim 9, means for producing a flow of ambient fluid over said members outside said first conduit means.

11. A device for modifying the temperature of a flowing fluid which comprises a support, a thermoelectric assembly thereon having a hot side and a cold side, electrical connections to said thermoelectric assembly for energization thereof, first and second conduit means for said fluid passing over said hot side and cold side of said thermoelectric assembly respectively, and temperature control means operatively connected to said first and second conduit means for controllably directing said fluid therethrough, thereby to control the heating or cooling of said fluid, said thermoelectric assembly comprising a plurality of thermoelectric elements alternating in type, having hot and cold faces, and arranged with their hot and cold faces opposing similar faces of adjacent elements, and heat conductive members interposed between said elements in good heat transmissive relation to the opposed faces thereof, said members between opposed hot faces of adjacent elements extending into said first conduit means, said members between opposed cold faces of adjacent elements extending into said second conduit means, said members being electrically conductive and in good electric conductivity relation to the opposed faces of said elements, said members interposed between hot faces of adjacent elements extending to a point outside said first conduit means, thereby to permit dissipation of heat therefrom independently of said first conduit means.

12. In the device of claim 11, means for producing a flow of ambient fluid over said members outside said first conduit means.

13. A device for modifying the temperature of a flowing fluid which comprises a support, a thermoelectric assembly thereon having a hot side and a cold side, electrical connections to said thermoelectric assembly for energization thereof, first and second conduit means for said fluid passing over said hot side and cold side of said thermoelectric assembly respectively, temperature control means operatively connected to said first and second conduit means for controllably directing said fluid therethrough, thereby to control the heating or cooling of said fluid, a humidfying means, and humidity control means for mingling the fluids emanating from said first and second conduit means and controllably directing said mingled fluids through said humidifying means.

14. In the combination of claim 13, a bypass around said humidifying means, said humidity control means controllably dividing said mingled fluid into first and second components respectively differently operatively affected by said humidifying means.

References Cited in the file of this patent

UNITED STATES PATENTS

| | | |
|---|---|---|
| 2,130,089 | Hull | Sept. 13, 1938 |
| 2,133,039 | Philipp | Oct. 11, 1938 |
| 2,268,769 | Newton | Jan. 6, 1942 |
| 2,944,404 | Fritts | July 12, 1960 |
| 2,949,014 | Belton | Aug. 16, 1960 |